US010724986B2

(12) United States Patent
Izadian et al.

(10) Patent No.: US 10,724,986 B2
(45) Date of Patent: Jul. 28, 2020

(54) DIELECTRIC ELECTROLYTE MEASUREMENT DEVICE

(71) Applicant: INDIANA UNIVERSITY RESEARCH AND TECHNOLOGY CORPORATION, Indianapolis, IN (US)

(72) Inventors: Afshin Izadian, Indianapolis, IN (US); Robert L. Bacallao, Indianapolis, IN (US)

(73) Assignee: Indiana University Research & Technology Corporation, Indianapolis, IN (US)

( * ) Notice: Subject to any disclaimer, the term of this patent is extended or adjusted under 35 U.S.C. 154(b) by 68 days.

(21) Appl. No.: 14/648,497

(22) PCT Filed: Nov. 27, 2013

(86) PCT No.: PCT/US2013/072337
§ 371 (c)(1),
(2) Date: May 29, 2015

(87) PCT Pub. No.: WO2014/085655
PCT Pub. Date: Jun. 5, 2014

(65) Prior Publication Data
US 2015/0308978 A1    Oct. 29, 2015

Related U.S. Application Data

(60) Provisional application No. 61/731,039, filed on Nov. 29, 2012.

(51) Int. Cl.
*G01N 27/447*    (2006.01)
*B01D 61/24*     (2006.01)
(Continued)

(52) U.S. Cl.
CPC ......... *G01N 27/447* (2013.01); *B01D 61/243* (2013.01); *B01D 61/28* (2013.01); *G01N 21/55* (2013.01); *G01N 21/64* (2013.01)

(58) Field of Classification Search
CPC ............. G01N 27/447; G01N 27/4473; G01N 27/44747; G01N 21/55; G01N 21/64; B01D 61/24; B01D 61/243; B01D 61/28
See application file for complete search history.

(56) References Cited

U.S. PATENT DOCUMENTS 5,909,280 A    6/1999    Zavracky
6,198,107 B1   3/2001    Seville
(Continued)

OTHER PUBLICATIONS

Techtarget, Definition of "dielectric material" (http://whatis.techtarget.com/definition/dielectric-material).*
(Continued)

*Primary Examiner* — Maris R Kessel
*Assistant Examiner* — Joshua L Allen
(74) *Attorney, Agent, or Firm* — Faegre Drinker Biddle & Reath LLP

(57) ABSTRACT

A system, device and apparatus for measuring electrolytes, where an electrical charge is applied to a measurement portion to draw ions from a liquid to a gel-solution via at least one electric field. The gel-solution containing the extracted ions is excited with light of a predetermined wavelength from an emitter. A receiver detects the illumination of the ions as a result of the excited gel-solution, and a processor converts the detected intensities of the illumination to a biologically useful value representing ionic concentration.

16 Claims, 4 Drawing Sheets

(51) Int. Cl.
*B01D 61/28* (2006.01)
*G01N 21/55* (2014.01)
*G01N 21/64* (2006.01)

(56) References Cited

U.S. PATENT DOCUMENTS

| | | | | |
|---|---|---|---|---|
| 6,811,663 | B1* | 11/2004 | Freeman | G01N 27/307 |
| | | | | 204/400 |
| 7,253,295 | B2 | 8/2007 | Ueno et al. | |
| 8,080,145 | B2* | 12/2011 | Strand | B01D 61/425 |
| | | | | 204/548 |
| 2004/0115838 | A1* | 6/2004 | Quake | B01D 57/02 |
| | | | | 436/538 |
| 2005/0139470 | A1* | 6/2005 | Sze | C07K 1/28 |
| | | | | 204/548 |
| 2007/0286773 | A1* | 12/2007 | Schlautmann | B01L 3/502707 |
| | | | | 422/68.1 |
| 2010/0062082 | A1* | 3/2010 | Staal | G01N 27/44743 |
| | | | | 424/722 |
| 2014/0014515 | A1* | 1/2014 | Santiago | G01N 27/44795 |
| | | | | 204/549 |
| 2014/0027282 | A1* | 1/2014 | Nakamura | C12Q 1/6806 |
| | | | | 204/450 |

OTHER PUBLICATIONS

To et al. (N To, I Sanada, H Ito, GS Prihandana, S Morita, Y Kanno, N Miki, Water-permeable dialysis membranes for multi-layered microdialysis systems, Frontiers in Bioengineering and Biotechnology, 3(70) (2015) 1-7 (Year: 2015).*

Search Report & Written Opinion issued in Int'l App. No. PCT/US2013/072337 (2014).

* cited by examiner

DIELECTRIC ELECTROLYTE MEASUREMENT DEVICE

CROSS-REFERENCE TO RELATED APPLICATIONS

This application is a U.S. nationalization under 35 U.S.C. § 371 of International Application No. PCT/US2013/072337, filed Nov. 27, 2013, which incorporates by reference and claims the benefit of U.S. Provisional Patent Application No. 61/731,039, filed Nov. 29, 2012 to Izadian et al., titled "Dielectric Electrolyte Measurement Device."

TECHNICAL FIELD

The present disclosure is directed to electrolyte processing and measurement. More specifically, the present disclosure is directed to systems, apparatuses and methods for utilizing electric field forces to separate electrolytes and measuring electrolyte concentrations using light radiation.

BACKGROUND

Chemically, electrolytes are substances that become ions in solution and acquire the capacity to conduct electricity. Among other areas, electrolytes are present in the human body, and the balance of the electrolytes in the human body is essential for normal function of cells and organs. Common electrolytes measured in blood testing include sodium, potassium, chloride, and bicarbonate.

Sodium (Na+) is a major positive ion (cation) in fluid outside of cells. Sodium regulates the total amount of water in the body and the transmission of sodium into and out of individual cells also plays a role in critical body functions. Many processes in the body, especially in the brain, nervous system, and muscles, require electrical signals for communication. The movement of sodium is critical in generation of these electrical signals. Too much (e.g., hypernatremia) or too little (e.g., hyponatremia) sodium therefore can cause cells to malfunction, and extremes in the blood sodium levels (too much or too little) can be fatal. Potassium (K+) is a major positive ion (cation) found inside of cells. The proper level of potassium is essential for normal cell function. Among the many functions of potassium in the body are regulation of the heartbeat and the function of the muscles. A seriously abnormal increase in potassium (e.g., hyperkalemia) or decrease in potassium (e.g., hypokalemia) can profoundly affect the nervous system and increases the chance of irregular heartbeats (arrhythmias), which, when extreme, can be fatal.

Typically, electrolytes are measured by a process known as potentiometry. This method measures the voltage that develops between the inner and outer surfaces of an ion selective electrode. The electrode (membrane) is typically made of a material that is selectively permeable to the ion being measured. This potential is measured by comparing it to the potential of a reference electrode. Since the potential of the reference electrode is held constant, the difference in voltage between the two electrodes is attributed to the concentration of ion in the sample.

However, in certain cases, electrolyte measurement devices do not adequately separate the electrolytes for measurement, and may experience dissociation issues when electrolytes are in water, since water molecules are dipoles and the dipoles orient in an energetically favorable manner to solvate the ions. Accordingly, improvements are needed in electrolyte measurement devices to better measure electrolytes such as potassium, and to expand the applicability of electrolyte measurement to devices such as portable electrolyte measurement devices, hand-held dialysis devices, forced accelerated dialysis and even water filtration.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
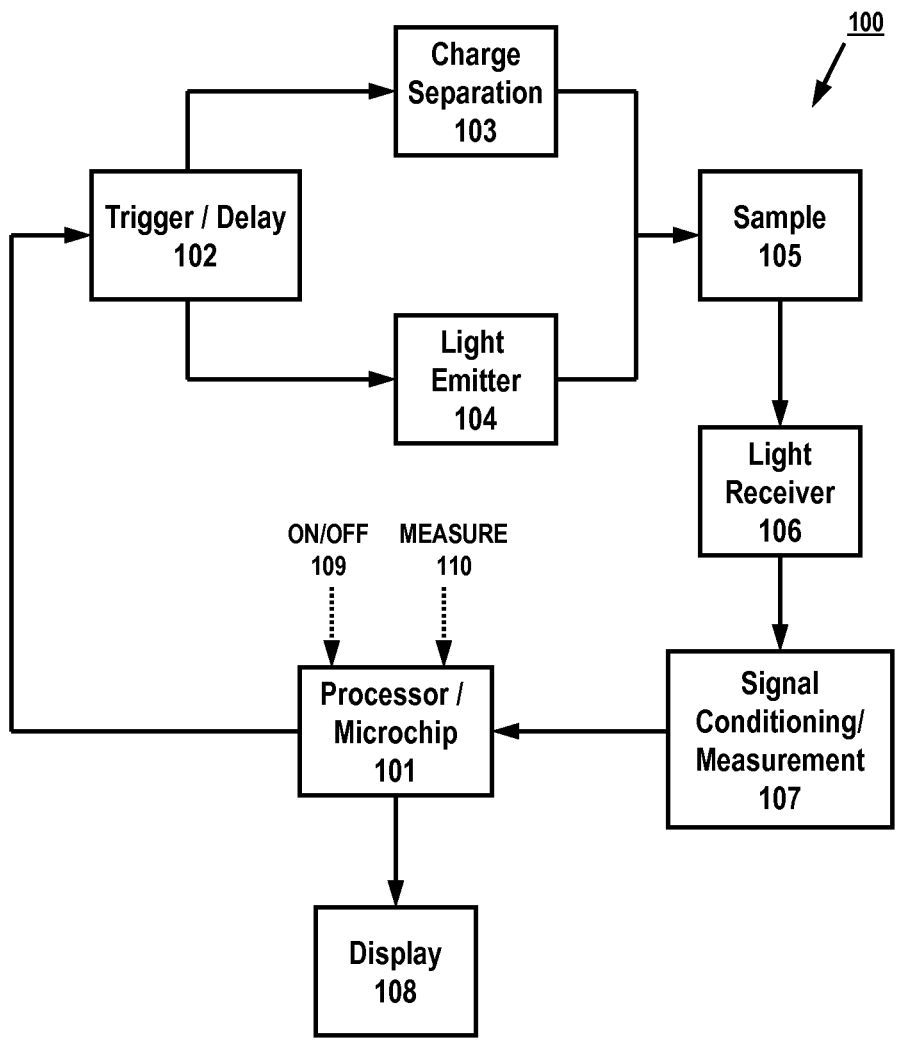
FIG. 1 illustrates an exemplary device for measuring electrolytes under one embodiment.

FIG. 1 illustrates an exemplary device 100 for measuring electrolytes under one embodiment, where device 100 comprises a processor/microchip arrangement 101 that may include a central processing unit (CPU), memory and all other required components (not shown for purposes of brevity) for interfacing with other device blocks or peripherals as is known in the art. Under a preferred embodiment, the memory will contain a conversion table for relating recorded light intensity to electrolyte concentration, as is discussed in greater detail below. Processor 101 may provide additional commands and instructions to device blocks and/or peripherals, such as a signal to trigger unit 102 for applying a charge to separate the ions in 103, and to the photodiode emitter 104 to expose gel containing at least a portion of sample 105 to a light of a specific wavelength. Processor 101 may be activated via on/off command 109 and measure command 110, provided by dedicated hardware (e.g., switch, button) or by integration via touch screen or other suitable devices.

Once device 100 is activated and processor 101 triggers the device, light receiver 106 is configured to capture light reflected from sample 105 after exposure and may convert the reflected light to one or more voltage values. Signal-conditioning unit 107 converts the measured voltage to the signal readable by processor 101. As the voltage is stabilized, processor 101 will calculate an accurate ion concentration from its stored tables and will trigger a display of the value. Display 108 is configured to display the measured ion concentration.

Figure 2:
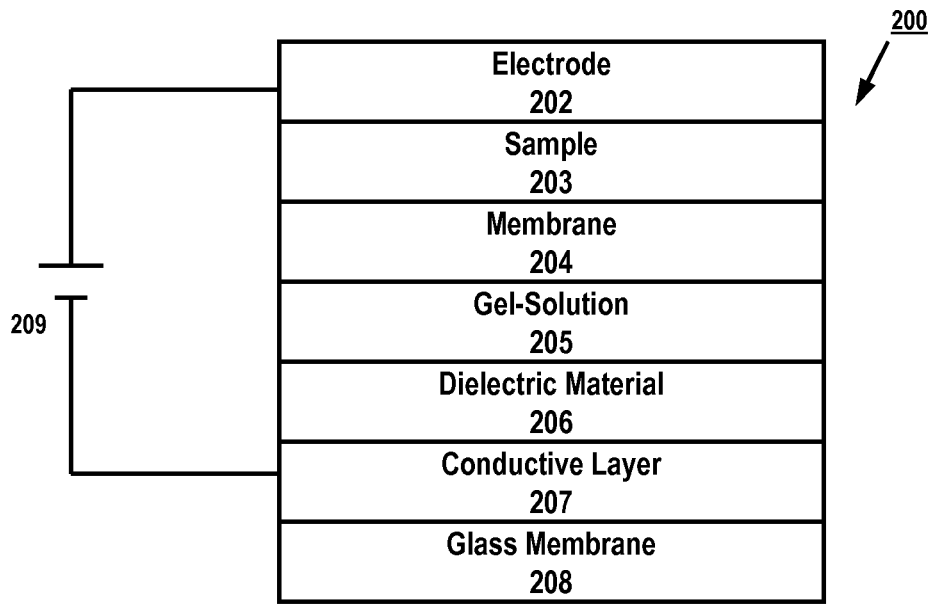
FIG. 2 illustrates a device measurement portion configuration for measuring electrolyte concentrations in a sample under another exemplary embodiment.

Turning to FIG. 2, an exemplary configuration is provided for a measurement portion 200 of device 100 for measuring electrolytes. Here, a top electrode 202 is coupled to an anode of a battery or cell 209. The cathode of cell 209 is coupled to conductive layer 207 where conductive layer 207 will serve to draw ions in its direction when cell 209 draws power. Additionally, conductive layer 207 is preferably made from a transparent conducting oxide such as indium tin oxide (ITO). ITO is particularly advantageous, due to its electrical conductivity and optical transparency, as well as the ease with which it can be deposited as a thin film. As with all transparent conducting films, a compromise may be made between conductivity and transparency, since increasing the thickness and increasing the concentration of charge carriers will increase the material's conductivity, but decrease its transparency. Under a preferred embodiment, the ITO conductive layer 207 may be between 750-1250 Å, and may be deposited by electron beam evaporation, physical vapor deposition, or a range of sputter deposition techniques known in the art. Conductive plastics and other transparent conductive layers can also be used.

Dielectric material 206 is preferably deposited between conductive layer 207 and electrode 202 as shown in FIG. 2 to polarize resulting electrical fields between electrode 202 and conductive layer 207 in order to provide dielectric polarization. Because of this polarization, layer 207 will assist in displacing positive charges (ions) toward the field and shifting negative charges in the opposite direction. In a preferred embodiment, dielectric material 206 is comprised of a chemical vapor deposited polymer such as parylene and may be 0.5-2.0 μm thick. Under one embodiment, the parylene may be deposited as a passivation coating. A glass membrane 208 is provided on the other side of conductive layer 207 to enclose measurement portion 200. Other transparent dielectric material can also be used with proper thickness to act as dielectric layer. Transparent wax material can also be used.

During electrolyte measurement, a sample is provided in 203, which may come from a disposable tip (described in detail below) or from a cartridge or other suitable medium for carrying liquids. Sample 203 is separated by membrane 204, which is preferably a dialysis membrane that separates sample 203 from spilling over contacts and covering gel-solution 205. Under a preferred embodiment, gel-solution 205 is a fluorescing solution for assisting in light radiation. Under one embodiment, solution 205 comprises agarose or other suitably porous medium. Agarose is particularly suitable due to it hysteresis qualities and gel stability at temperatures near human body temperatures. Additionally, solution 205 may comprise a chemical buffering agent, such as sodium (Na) HEPES, as well as an emulsifier, such as microcrystalline cellulose (MCC). Under another embodiment, solution 205 specifically comprises 1% agarose, 5 mm Na HEPES, and 40 μm MCC. It is understood by those skilled in the art that other materials and mixture concentrations may be used depending on the needs of the designer.

Figure 2A:
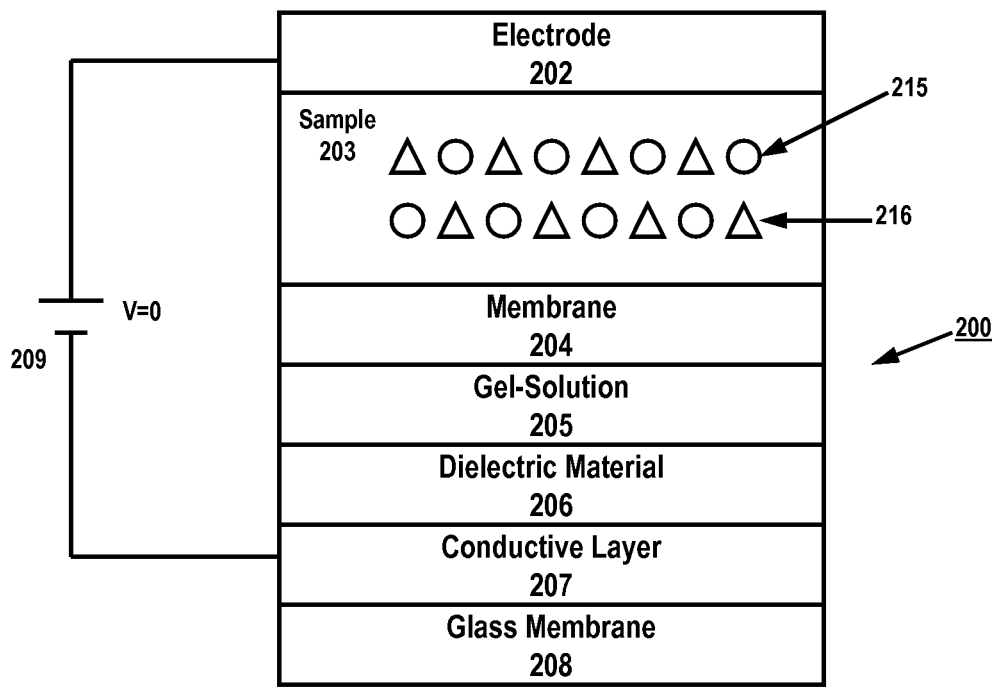
FIG. 2A illustrates an arrangement of electrolytes under one exemplary voltage condition for the embodiment of FIG. 2.
Figure 2B:
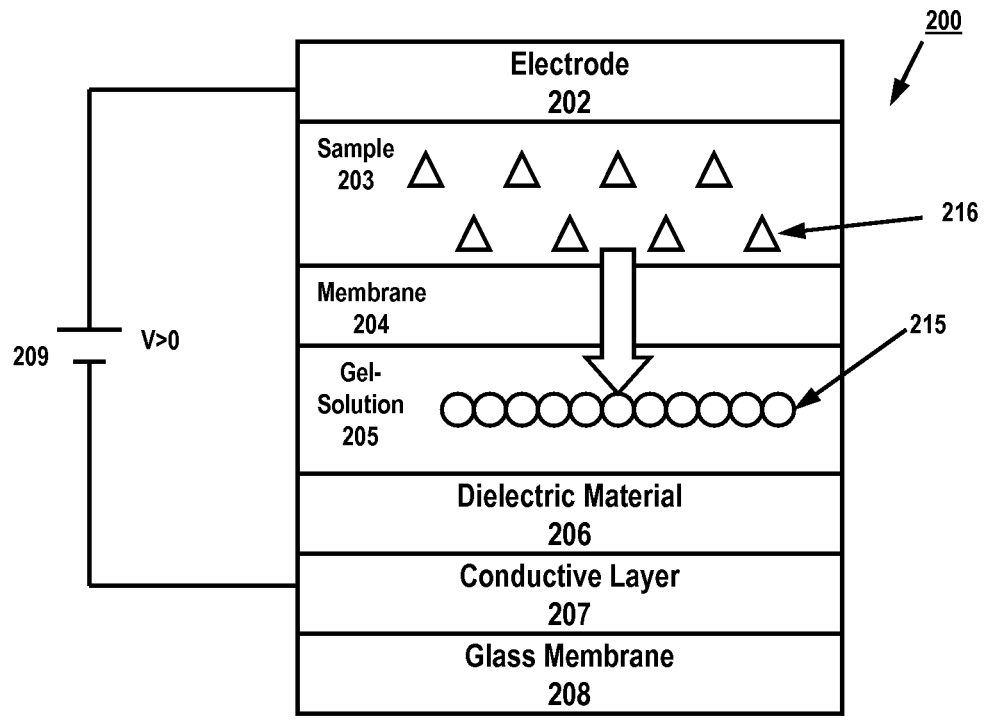
FIG. 2B illustrates an arrangement of electrolytes under another exemplary voltage condition for the embodiment of FIG. 2.
Figure 2C:
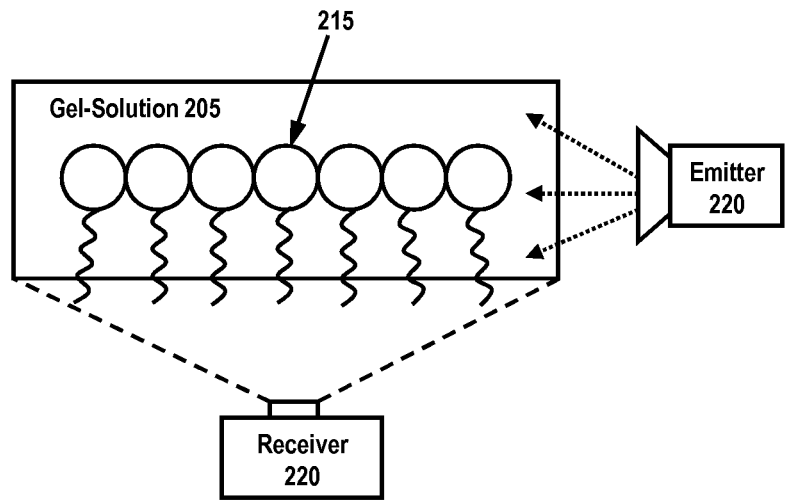
FIG. 2C illustrates a configuration for illuminating and measuring electrolytes from FIG. 2B under one exemplary embodiment.

Turning to FIGS. 2A-C, various embodiments are illustrated utilizing the configuration of FIG. 2. The same or similar items from FIG. 2 are represented by the same reference numbers in FIGS. 2A-C and discussion of these reference numbers will not be repeated for the sake of brevity. In the example of FIG. 2A, the embodiment is illustrated as a biological electrolyte measurement device for measuring ion concentrations. More specifically, sample 203 is comprised of blood where potassium (K+) ion concentrations are to be measured. In this example, a drop of blood (e.g., 20 μl) is placed on dialysis membrane 204. As explained above, membrane 204 serves to enclose the blood from spilling over contacts and covering gel-solution 205 outer surface. As is shown in FIG. 2A the blood in sample 203 comprises potassium (215) and bilirubin (216). In order to get a more accurate measurement, potassium ions 215 should be separated from the bilirubin 216, as bilirubin 216 absorbs light and may impede fluorescing. As the blood 203 is deposited on membrane 204, voltage is initially set at V=0.

As voltage is increased (V>0) in FIG. 2B, the DC electrical field generated from dielectric material 206 draws the K+ ions 215 and other positively charged ions into gel-solution 205, while leaving behind bilirubin 216. Accordingly, the applied voltage acts as a charge separation device to absorb the K+ ions and separate them from the non-polar bilirubin, thus accelerating the process of K+ separation for concentration measurement. Once the K+ ions 215 are absorbed into gel-solution 205, an emitter 220 exposes solution 205 (containing ions 215) to light of a predetermined wavelength, as shown in FIG. 2C. In one embodiment, emitter 220 may be a photodiode or other suitable device. As ions 215 fluoresce due to the light exposure, receiver 220 captures the light illumination to determine ionic concentration, where the level of illumination is correlated to the concentration of ions (i.e., higher concentration=higher illumination, and vice versa). Under a preferred embodiment, the captured illumination values are subsequently transposed, via look-up table or other suitable means, to a biologically useful ion concentration value. In one embodiment, a light wavelength of 300-500 nm may be used to excite the gel-solution 205, and receiver 220 may be in the form of a charge-coupled device (CCD) camera or other light measurement sensors.

Figure 3A:
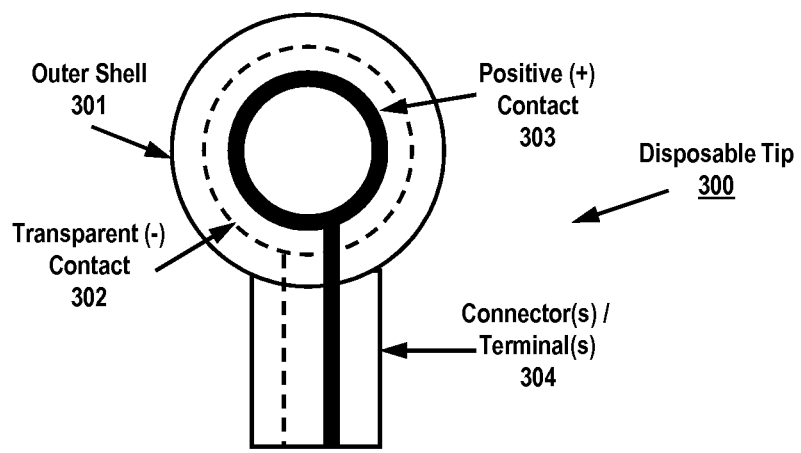
FIG. 3A illustrates one exemplary view of a disposable tip for collecting and measuring electrolytes under another embodiment.
Figure 3B:
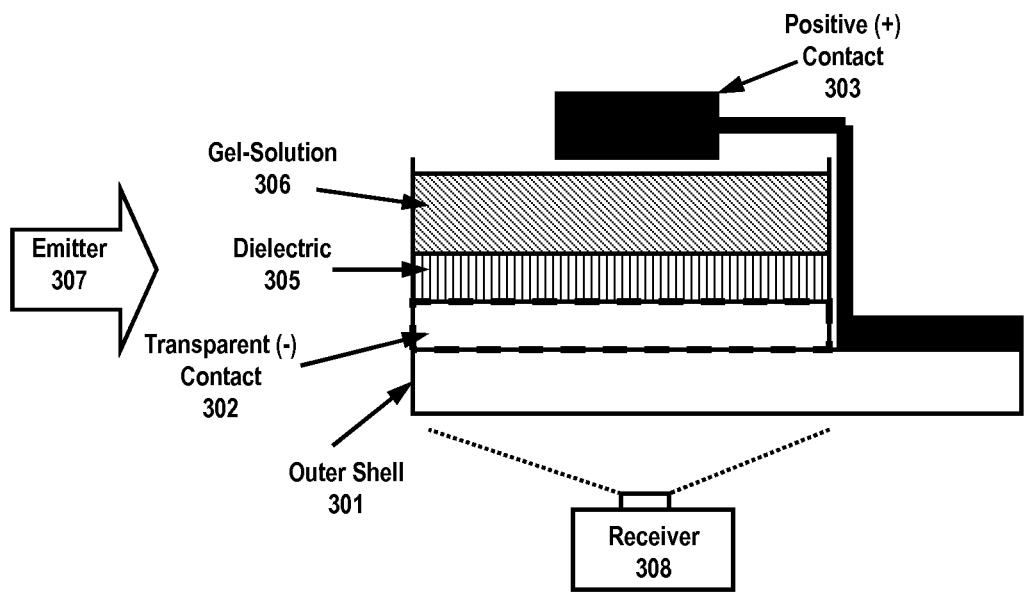
FIG. 3B illustrates another exemplary view of the disposable tip if FIG. 3A for collecting and measuring electrolytes.

Turning to FIGS. 3A-B, a device incorporating measurement portion 200 discussed above, may be embodied having a disposable tip that may be used to locate a drop of blood from a human or other mammal. In this example, disposal tip may comprise several layers of material on dielectric layer to separate the charges from blood to a gel-solution. The material used for dielectric 305 and/or contact 302 should be transparent over a wide range of light wavelength, preferably from 430 nm to 670 nm. The overall shape of tip 300 is shown in FIG. 3A, where a charge separation tip comprises electrode contacts (302, 303) on both sides of the gel and blood (see FIG. 3B). Under a preferred embodiment, the negative electrode 302 connects the dielectric to a substrate. This electrode will be conductive and transparent to eliminate any beam power loss emitted from gel-potassium bonds.

The disposal tip 300 is preferably a cylindrical tube that contains the charge separation elements and has empty space to hold a blood droplet. Between electrodes is a transparent conductive layer 302, a transparent dielectric layer 305, and gel-solution 306 (e.g., aqueous gel). Once a blood drop is located at the tip through the positive electrode 303, the applied electric field will force the positive ions to migrate from the blood to the gel, as described above. Under one embodiment, disposal tip 300 is located on a handheld device that (1) energizes electrodes to separate charges, (2) emits specific wavelength light to the charge separated blood sample, (3) measures the reflected light from the sample, and (4) displays a potassium concentration related number.

Regarding the light emitter and measurement tools, these parts of the device may be configured to hold the tip in place and make a secure connection to the electrodes. Under one embodiment, after the charge separation has occurred, a 430 nm light is emitted from a photodiode (307) to the gel. When the light hits the potassium-gel bonds, it will emit a relative light of wavelength 460-650 nm. Other wavelengths may also be used as the material may change. The intensity of the received light determines the potassium concentration. A light receiver (photo detector) 308 is configured to collect the light through a lens and will convert it to a voltage. The output voltage is related to the light intensity received by the photo detector. The emitter, tip position, and the reflected beam measurement are shown in FIG. 3B.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A system for monitoring electrolytes in a liquid, comprising:
    a gel-solution;
    a circuit configured to apply an electric field to separate ions from the liquid into the gel-solution;
    a light emitter configured to excite the gel-solution, containing the ions, with light of a predetermined wavelength;
    a receiver configured to optically detect the illumination of the ions in the gel-solution resulting from the excitation;
    a processing device configured to determine intensities of the detected illumination, and to convert the intensities to a value representing one or more concentration values for the ions;
    a dialysis membrane disposed between the liquid and the gel-solution such that the dialysis membrane permits the ions to penetrate the dialysis membrane and into the gel-solution based on the circuit applying the electric field; and
    a glass membrane disposed on a surface of a conductive layer opposite a surface of the conductive layer in contact with a dielectric material, wherein
        the circuit comprises:
            an electrode;
            the conductive layer; and
            the dielectric material, wherein the dielectric material is disposed between the conductive layer and the gel-solution to provide conductive separation between the conductive layer and the gel-solution.

2. The system of claim 1, wherein the circuit is configured to apply a DC electric field that is used to separate the ions from the liquid into the gel-solution in the direction of the conductive layer.

3. The system of claim 1, wherein the light emitter comprises a photodiode and the receiver comprises a charge-coupled device (CCD) camera.

4. The system of claim 1, wherein the processing device comprises a signal conditioning unit.

5. The system of claim 1, wherein the gel-solution comprises one of (i) a fluorescing solution configured to assist in light radiation, and (ii) a chemical buffering agent.

6. The system of claim 1, wherein the predetermined wavelength is between 300-500 nm.

7. The system of claim 1, wherein the processing device comprises a look-up table for comparing the converted value for representing one or more concentration values for the ions.

8. A method for operating the system of claim 1 to monitor electrolytes in a liquid, comprising the steps of:
    applying the electric field to separate ions from the liquid into the gel-solution;
    exciting the gel-solution, containing the separated ions, with the light of the predetermined wavelength;
    optically detecting the illumination of the ions in the gel-solution resulting from the excitation; and
    converting the intensities of the detected illumination to the value representing the one or more concentration values for the ions, wherein a transparent second dielectric material is separated from the dielectric material by the conductive layer.

9. The method of claim 8, wherein the gel-solution comprises a fluorescing solution configured to assist in light radiation.

10. The method of claim 9, wherein the fluorescing solution comprises agarose.

11. The method of claim 8, wherein the gel-solution comprises a chemical buffering agent.

12. The method of claim 11, wherein the chemical buffering agent comprises sodium HEPES and an emulsifier.

13. The method of claim 8, wherein the step of applying the electric field comprises generating a DC electric field between the electrode and the conductive layer, wherein the ions are separated from the liquid into the gel-solution in the direction of the conductive layer.

14. The method of claim 8, wherein the predetermined wavelength is 300-500 nm.

15. The method of claim 8, wherein the step of optically detecting the illumination comprises detecting illumination via a light measurement sensor.

16. The method of claim 8, wherein converting the intensities of the detected illumination to the value representing the one or more concentration values for the ions comprises converting the detected illumination to one or more voltage values representing ion concentration.

* * * * *